US010853648B2

(12) United States Patent
Oyaizu et al.

(10) Patent No.: US 10,853,648 B2
(45) Date of Patent: Dec. 1, 2020

(54) IMAGE PROCESSING APPARATUS AND IMAGE PROCESSING METHOD

(71) Applicant: SONY CORPORATION, Tokyo (JP)

(72) Inventors: Hideki Oyaizu, Tokyo (JP); Makibi Nakamura, Tokyo (JP); Atsushi Ito, Kanagawa (JP); Yuki Asukabe, Saitama (JP); Masayuki Yokoyama, Tokyo (JP)

(73) Assignee: SONY CORPORATION, Tokyo (JP)

( * ) Notice: Subject to any disclaimer, the term of this patent is extended or adjusted under 35 U.S.C. 154(b) by 145 days.

(21) Appl. No.: 16/083,887

(22) PCT Filed: Jan. 6, 2017

(86) PCT No.: PCT/JP2017/000254
§ 371 (c)(1),
(2) Date: Feb. 12, 2019

(87) PCT Pub. No.: WO2017/159003
PCT Pub. Date: Sep. 21, 2017

(65) Prior Publication Data
US 2019/0171882 A1 Jun. 6, 2019

(30) Foreign Application Priority Data
Mar. 17, 2016 (JP) .................. 2016-053609

(51) Int. Cl.
*G06K 9/00* (2006.01)
*G10H 1/00* (2006.01)
(Continued)

(52) U.S. Cl.
CPC ........ *G06K 9/00671* (2013.01); *G06T 11/001* (2013.01); *G10H 1/00* (2013.01);
(Continued)

(58) Field of Classification Search
CPC combination set(s) only.
See application file for complete search history.

(56) References Cited

U.S. PATENT DOCUMENTS

| 2004/0009683 A1* | 1/2004 | Hiraoka | ................ H01L 21/568 439/75 |
| 2004/0093166 A1* | 5/2004 | Kil | ........................... G01N 1/06 702/19 |

(Continued)

FOREIGN PATENT DOCUMENTS

| CN | 101783886 A | 7/2010 |
| CN | 101877753 A | 11/2010 |

(Continued)

OTHER PUBLICATIONS

Iwai, et al., "ThermoRetouch & ThermoModeler: Heat Sensation in Image Creation with Thermal Vision", vol. 6, Issue 2, pp. 65-75.

(Continued)

Primary Examiner — Wesner Sajous
(74) Attorney, Agent, or Firm — Chip Law Group

(57) ABSTRACT

State information corresponding to a subject on a visible light image, such as temperature information and sound field information, is acquired from state information indicating a subject state not indicated on the visible light image by an information acquisition unit. An effect processing unit performs an effect process on the visible light image on the basis of the state information acquired by the information acquisition unit. In the effect process, an effect component image is superimposed or a subject image is modified based on the type and temperature of the subject and an effect component image is superimposed or a subject image is modified based on the type of a sound source and the volume of a sound.

9 Claims, 15 Drawing Sheets

(51) Int. Cl.
*G10L 25/51* (2013.01)
*G10L 25/57* (2013.01)
*H04N 5/232* (2006.01)
*G06T 11/00* (2006.01)

(52) U.S. Cl.
CPC ........... *G10H 1/0091* (2013.01); *G10L 25/51* (2013.01); *H04N 5/232* (2013.01); *G10H 2220/455* (2013.01); *G10L 25/57* (2013.01)

(56) References Cited

U.S. PATENT DOCUMENTS

| | | | |
|---|---|---|---|
| 2009/0021602 A1* | 1/2009 | Fujiwara | H04N 5/23219 348/223.1 |
| 2009/0295948 A1 | 12/2009 | Oishi | |
| 2010/0182501 A1 | 7/2010 | Sato et al. | |
| 2010/0277618 A1 | 11/2010 | Hiratsuka | |
| 2013/0169796 A1* | 7/2013 | Van Der Burgt | H05B 45/24 348/135 |
| 2014/0315161 A1 | 10/2014 | Sako et al. | |

FOREIGN PATENT DOCUMENTS

| | | |
|---|---|---|
| CN | 104113683 A | 10/2014 |
| JP | 2009-141555 A | 6/2009 |
| JP | 2009-248665 A | 10/2009 |
| JP | 2009-284234 A | 12/2009 |
| JP | 2010-237516 A | 10/2010 |
| JP | 2010-263340 A | 11/2010 |
| JP | 2011-097264 A | 5/2011 |
| JP | 2014-006912 A | 1/2014 |
| JP | 2014-211748 A | 11/2014 |
| JP | 2015-177313 A | 10/2015 |
| WO | 2016/072120 A1 | 5/2016 |

OTHER PUBLICATIONS

International Search Report and Written Opinion of PCT Application No. PCT/JP2017/000254, dated Mar. 21, 2017, 12 pages of ISRWO.

Iwai, et al., "ThermoRetouch & ThermoModeler: Heat Sensation in Image Creation with Thermal Vision", vol. 6, No. 2, pp. 65-75.

* cited by examiner

       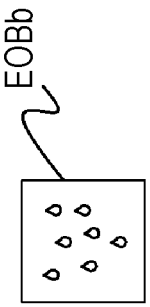 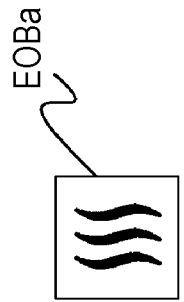
FIG. 5A  FIG. 5B  FIG. 5C  FIG. 5D  FIG. 5E  FIG. 5F

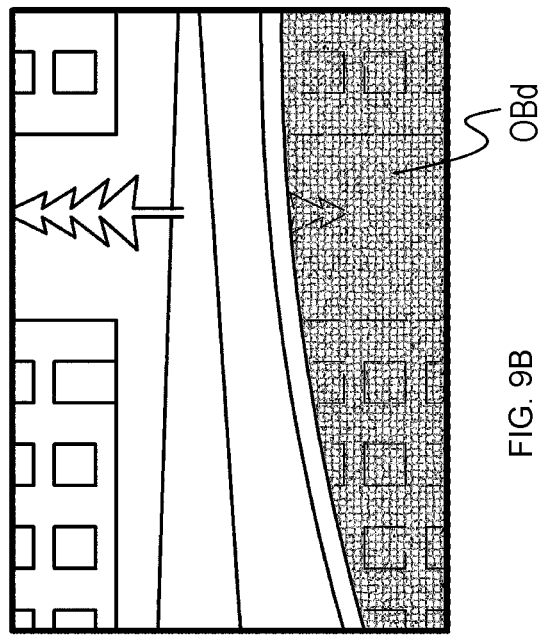
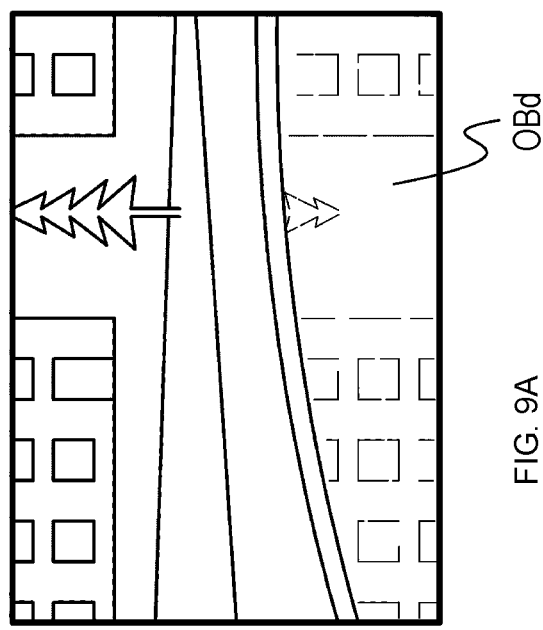

FIG. 11
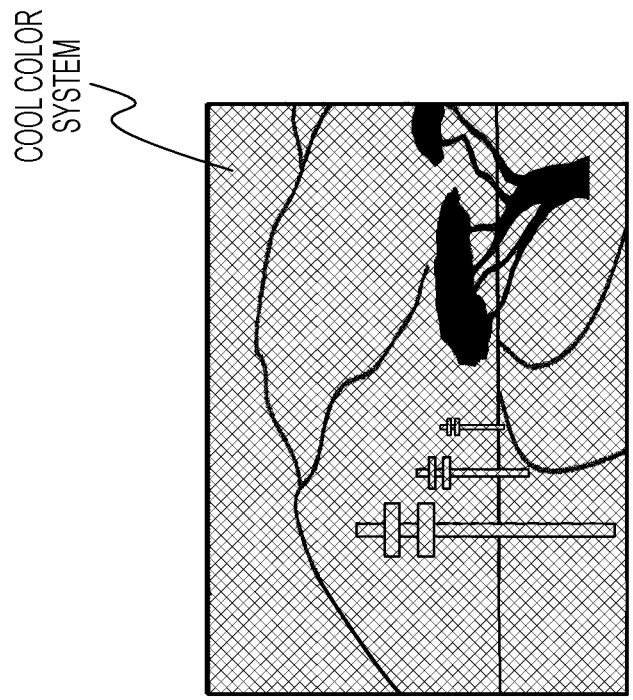
FIG. 11B
COOL COLOR SYSTEM
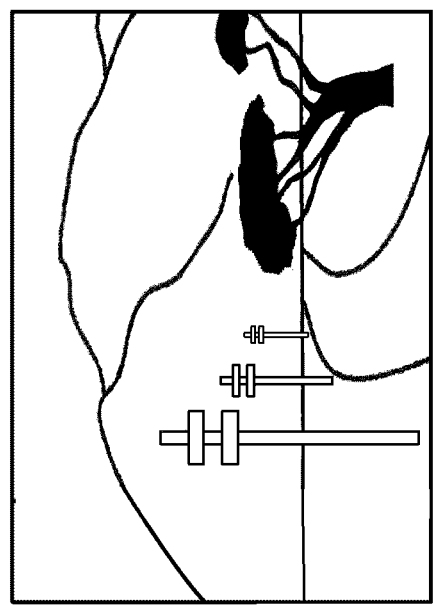
FIG. 11A

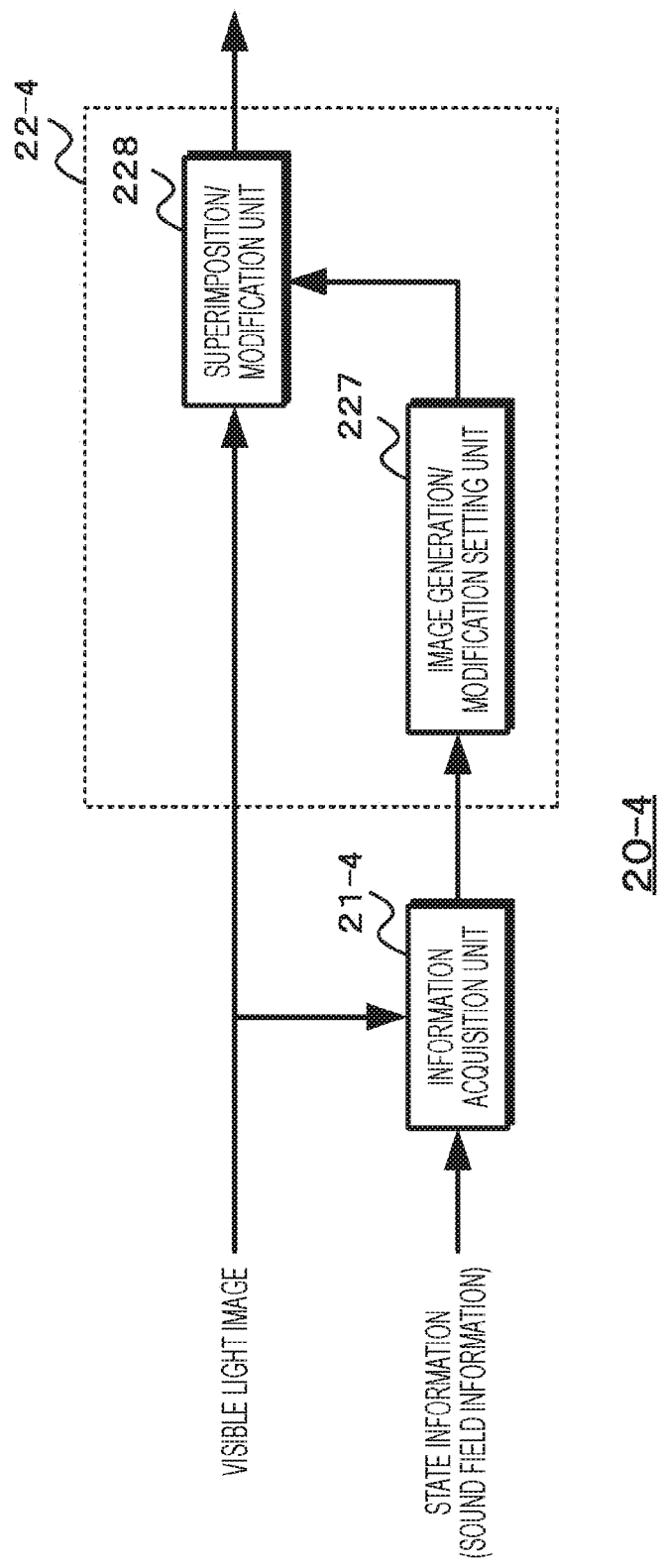

IMAGE PROCESSING APPARATUS AND IMAGE PROCESSING METHOD

CROSS REFERENCE TO RELATED APPLICATIONS

This application is a U.S. National Phase of International Patent Application No. PCT/JP2017/000254 filed on Jan. 6, 2017, which claims priority benefit of Japanese Patent Application No. JP 2016-053609 filed in the Japan Patent Office on Mar. 17, 2016. Each of the above-referenced applications is hereby incorporated herein by reference in its entirety.

TECHNICAL FIELD

This technology relates to an image processing apparatus, an image processing method, and a program and makes it possible to improve the reality of a visible light image.

BACKGROUND ART

Conventionally, a visible light image is acquired using an imaging apparatus to create a preferable photograph by adjusting the contrast, brightness, white balance, hue, saturation and the like of the acquired visible light image.

In addition, an alarm or the like is made on the basis of state information indicating a subject state not indicated on the visible light image. For example, Patent Document 1 discloses that imaging is performed using an infrared imaging apparatus such that temperature information on a road surface is acquired as the state information indicating a subject state and, on the basis of the acquired temperature information, a region estimated to be frozen in a road surface image is emphasized to be displayed.

Meanwhile, according to Non-Patent Document 1, in accordance with a temperature change caused on a screen by a person, the saturation, hue, three-dimensional shape, and the like of an image projected on this screen are changed.

CITATION LIST

Patent Document

Patent Document 1: Japanese Patent Application Laid-Open No. 2009-248665

Non-Patent Document

Non-Patent Document 1: Daisuke Iwai, Kosuke Sato "ThermoRetouch & ThermoModeler: Heat Sensation in Image Creation with Thermal Vision", The Journal of the Society for Art and Science, Vol. 6, No. 2 (2007): pp. 65-75

SUMMARY OF THE INVENTION

Problems to be Solved by the Invention

Incidentally, visible light images visually having no difference are regarded as the same as each other even if subjects are, for example, in a high temperature state or a low temperature state and its reality is poor. In addition, Patent Document 1 is a technology for making an alarm or the like on the basis of the state information and it is thus not possible to improve the reality of the visible light image. Furthermore, Non-Patent Technical Document 1 is a technology for changing an image in accordance with a temperature change caused on a screen by a person and the reality of the visible light image cannot be improved because a change in an image does not correlate with a subject state.

Thus, it is an object of this technology to provide an image processing apparatus, an image processing method, and a program capable of improving the reality of a visible light image.

Solutions to Problems

A first aspect of this technology is an image processing apparatus including:
an information acquisition unit that acquires state information corresponding to a subject on a visible light image from state information indicating a subject state not indicated on the visible light image; and
an effect processing unit that performs an effect process on the visible light image on the basis of the state information acquired by the information acquisition unit.

In this technology, state information corresponding to a subject on a visible light image, such as temperature information and sound field information, is acquired from state information indicating a subject state not indicated on the visible light image by the information acquisition unit. In the effect processing unit, an effect process based on the temperature information and the sound field information is performed on the visible light image on the basis of the state information acquired by the information acquisition unit.

The information acquisition unit acquires type information on the subject by performing a recognition process for the subject, and the effect processing unit superimposes an effect component image according to a temperature and a type of the subject onto a subject image on the basis of state information and the type information. In addition, an attribute of the effect component image is controlled in accordance with a difference in temperature. The effect component image is employed as an image schematically representing a visually observable phenomenon that occurs in accordance with temperature. In addition, the effect processing unit modifies the subject image on the visible light image into an image to which a change in a physical state of the subject, for example, a change between a solid phase and a liquid phase, is added in accordance with a temperature of the subject. The effect processing unit controls a modification level in accordance with a difference in the temperature. In addition, the effect processing unit may perform color adjustment on the visible light image in accordance with a temperature of the subject in such a manner that color adjustment to a warm color system is performed when a temperature of the subject is high and color adjustment to a cool color system is performed in a case where a temperature of the subject is low. In a case where the state information is the sound field information, the effect processing unit superimposes an effect component image associated with a sound output from a sound source onto a subject on the visible light image corresponding to a position of the sound source based on the sound field information on a region of the visible light image. In addition, the effect processing unit adjusts an effect amount for the visible light image in accordance with intensity of a sound output from a sound source.

A second aspect of this technology is an image processing method including:
acquiring, by an information acquisition unit, state information corresponding to a subject on a visible light image from state information indicating a subject state not indicated on the visible light image; and performing, by an effect processing unit, an effect process on the visible light image on the basis of the state information acquired by the information acquisition unit.

A third aspect of this technology is a program that causes a computer to implement:

a function of acquiring state information corresponding to a subject on a visible light image from state information indicating a subject state not indicated on the visible light image; and a function of performing an effect process on the visible light image on the basis of the state information corresponding to the subject on the visible light image.

Note that the program according to the present technology is a program that can be provided, for example, to a general-purpose computer capable of executing a variety of program codes by a storage medium or a communication medium that provides a program in a computer-readable format, for example, a storage medium such as an optical disc, a magnetic disk, and a semiconductor memory or a communication medium such as a network. By providing such a program in a computer-readable format, a process according to the program is implemented on the computer.

Effects of the Invention

According to this technology, state information corresponding to a subject on a visible light image is acquired from state information indicating a subject state not indicated on the visible light image by the information acquisition unit. The effect processing unit performs an effect process on the visible light image on the basis of the state information acquired by the information acquisition unit. Therefore, the reality of the visible light image can be improved. Note that the effects described in the present description merely serve as examples and not construed to be limited. There may be an additional effect as well.

BRIEF DESCRIPTION OF DRAWINGS

FIGS. 5A, 5B, 5C, 5D, 5E, and 5F are diagrams for explaining an operation of generating an effect component image.

FIGS. 9A and 9B are diagrams illustrating a case where the temperature is low as an operation example of the second embodiment.

FIGS. 11A and 11B are diagrams illustrating a case where the temperature is low as an operation example of the third embodiment.

FIG. 13 is a diagram exemplifying the configuration of a fourth embodiment.

MODE FOR CARRYING OUT THE INVENTION

Hereinafter, modes for carrying out the present technology will be described. Note that the description will be given in the following order.

Figure 1:
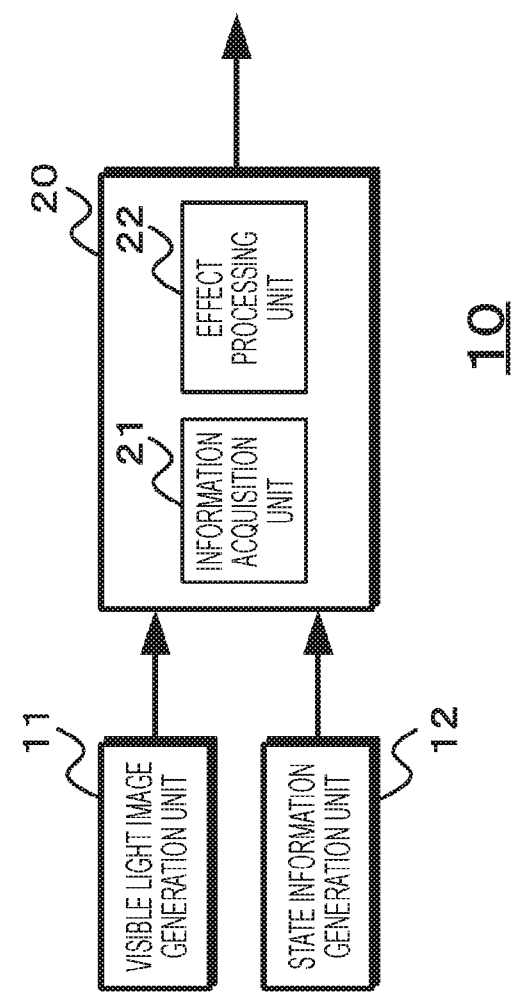
FIG. 1 is a diagram exemplifying the configuration of a system using an image processing apparatus.

1. Configuration of Image Processing Apparatus
2. First Embodiment
2-1. Configuration of First Embodiment
2-2. Operation of First Embodiment
3. Second Embodiment
3-1. Configuration of Second Embodiment
3-2. Operation of Second Embodiment
4. Third Embodiment
4-1. Configuration of Third Embodiment
4-2. Operation of Third Embodiment
5. Fourth Embodiment
5-1. Configuration of Fourth Embodiment
5-2. Operation of Fourth Embodiment
6. Other Embodiments 1. Configuration of Image Processing Apparatus FIG. 1 exemplifies the configuration of a system using an image processing apparatus. The system 10 has a visible light image generation unit 11, a state information generation unit 12, and an image processing apparatus 20. The visible light image generation unit 11 is an apparatus that generates image data of a visible light image and, for example, an imaging apparatus that has sensitivity in a visible light region and is configured using a color filter, an imaging device, or the like is used. The visible light image generation unit 11 generates image data of a visible light image including a subject and outputs the generated image data to the image processing apparatus 20. The state information generation unit 12 is an apparatus that generates state information indicating a subject state not indicated on the visible light image. For example, in a case where temperature information is generated as the state information, an infrared imaging apparatus or the like that has sensitivity in a far infrared light region and is configured using a microbolometer or the like is used as the state information generation unit 12. Meanwhile, for example, in a case where sound field information is generated as the state information, a microphone array apparatus or the like in which a plurality of microphones is, for example, two-dimensionally arranged is used as the state information generation unit 12. The state information generation unit 12 generates the state information indicating a subject state not indicated on the visible light image and outputs the generated state information to the image processing apparatus 20.

On the basis of the state information generated by the state information generation unit 12, the image processing apparatus 20 performs an effect process on the visible light image of the image data generated by the visible light image generation unit 11, to improve the reality on the basis of the state information generated by the state information generation unit 12. The image processing apparatus 20 has an information acquisition unit 21 and an effect processing unit 22. The information acquisition unit 21 acquires state information corresponding to a subject on the visible light image from the state information generated by the state information generation unit 12. The effect processing unit 22 performs the effect process on the visible light image on the basis of the state information acquired by the information acquisition unit 21.

2. First Embodiment

In a first embodiment, the state information is the temperature information and the image processing apparatus improves the reality of the visible light image by superimposing an effect component image according to the temperature of the subject onto the visible light image.

2-1. Configuration of First Embodiment

Figure 2:
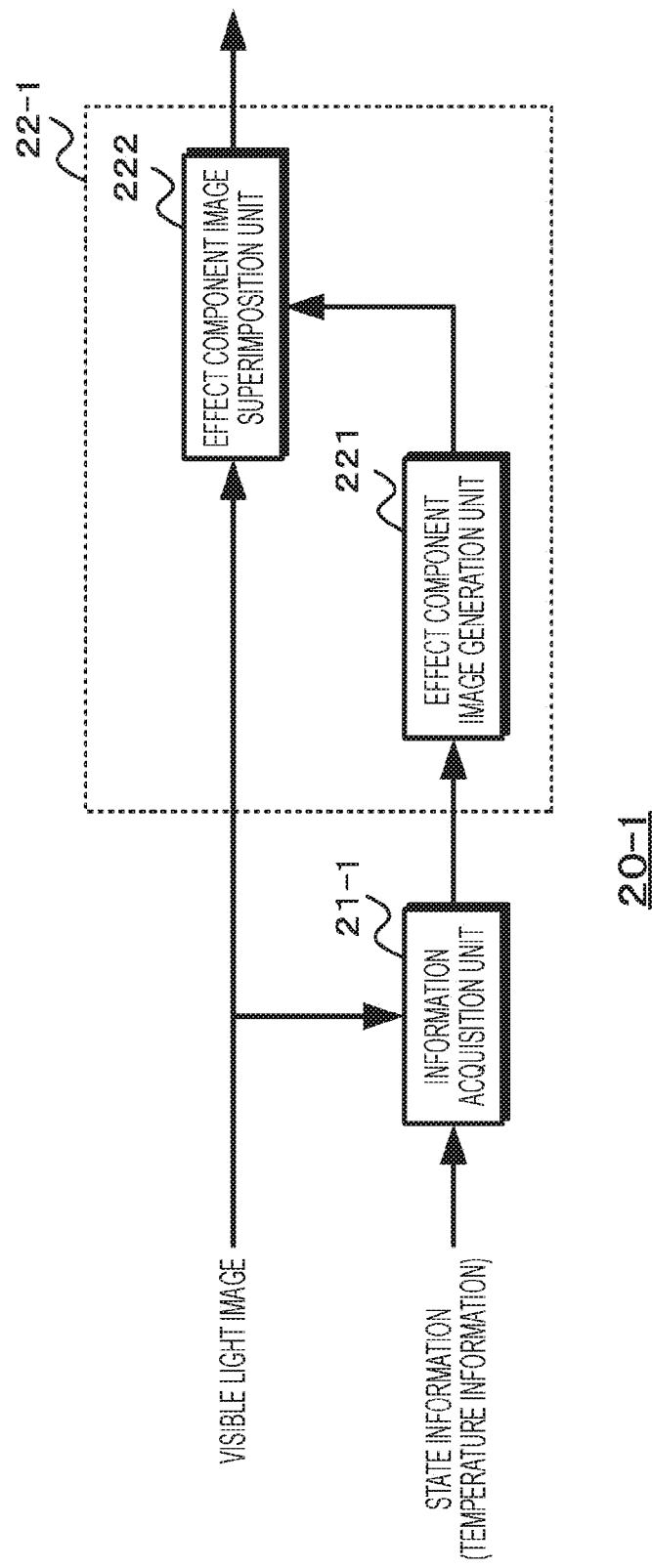
FIG. 2 is a diagram exemplifying the configuration of an image processing apparatus of a first embodiment.

FIG. 2 exemplifies the configuration of an image processing apparatus of the first embodiment. The image processing apparatus 20-1 has an information acquisition unit 21-1 and an effect processing unit 22-1. The effect processing unit 22-1 has an effect component image generation unit 221 and an effect component image superimposition unit 222.

The information acquisition unit 21-1 performs a recognition process and a region segmentation process for the subject on the basis of the visible light image. The information acquisition unit 21-1 identifies what type of entity the subject is in the recognition process and generates type information. The information acquisition unit 21-1 also identifies the region of the subject in the region segmentation process. As for the recognition process and the region segmentation process, for example, it is possible to identify the type and the region of the subject using the technology disclosed in the document "Shotton, Jamie, et al., "Texton-Boost: Joint appearance, shape and context modeling for multi-class object recognition and segmentation", Computer Vision ECCV 2006, Springer Berlin Heidelberg, 2006, pp. 1-15". In addition, the information acquisition unit 21-1 acquires the temperature information on each subject from the temperature information, which is the state information generated by the state information generation unit 12, on the basis of a processing result of the region segmentation process. Furthermore, the information acquisition unit 21-1 may confirm the consistency between the temperature information and the type identification result. By confirming the consistency, for example, even if a person is erroneously identified as a tree, it can be detected that the subject is not a tree on the basis of the temperature information, such that the accuracy of the recognition process can be enhanced. The information acquisition unit 21-1 acquires the type information on the subject and its region and temperature information on the visible light image for each subject to output to the effect component image generation unit 221 of the effect processing unit 22-1.

The effect component image generation unit 221 generates an effect component image for improving the reality in accordance with the type and temperature of the subject on the basis of the type information and temperature information on the subject. The effect component image is an image schematically representing a visually observable phenomenon that occurs in a subject in accordance with temperature. For example, in a case where the subject is a drink container, steam is produced above the drink container when the liquid in the drink container is at high temperature, while water droplets are produced around the drink container when the liquid is at low temperature. Accordingly, the effect component image generation unit 221 generates an effect component image for the drink container using pre-generated element images individually indicating, for example, steam, water droplets, and the like. In addition, the effect component image generation unit 221 may control attributes of the effect component image, for example, the dimension and the number of the element images, on the basis of the temperature information. For example, as the temperature rises, the effect component image generation unit 221 enlarges the size of an element image indicating steam or increases the number of the element images. Alternatively, as the temperature lowers, the number of element images indicating water droplets may be increased. The effect component image generation unit 221 outputs the generated effect component image to the effect component image superimposition unit 222. Note that the effect component image generation unit 221 may store in advance the effect component images according to the types and temperatures of subjects and, on the basis of the type information and the temperature information supplied from the information acquisition unit 21-1, selects an effect component image corresponding to the type and the temperature to output to the effect component image superimposition unit 222.

The effect component image superimposition unit 222 superimposes the effect component image generated by the effect component image generation unit 221 onto the image of the corresponding subject, thereby improving the reality of the visible light image. The image region of the subject is identified by the region segmentation process described above. In addition, the effect component image is generated in accordance with the type and temperature of the subject whose image region has been identified. Accordingly, the effect component image superimposition unit 222 can superimpose the effect component image onto the image of the corresponding subject. Note that the superimposition of the effect component image onto the image of the subject is not restricted to the case of superimposing the effect component image on top of the image of the subject but also includes the case of superimposing the effect component image onto a position specified using the image of the subject as a reference. For example, an effect component image indicating water droplets is superimposed on top of the image of the drink container. Meanwhile, an effect component image indicating steam is superimposed at a position above the image of the drink container using the image of the drink container as a reference. In addition, the effect component image superimposition unit 222 can superimpose an effect component image of an appropriate size onto the image of the subject if the size of the effect component image is adjusted in accordance with the size of the image region of the subject. Alternatively, the effect component image may be generated by the effect component image generation unit 221 in accordance with the size of the image region of the subject. The effect component image superimposition unit 222 records the visible light image, onto which the effect component image has been superimposed to improve the reality, to a recording medium or outputs the visible light image to external equipment such as a display apparatus or a recording apparatus.

2-2. Operation of First Embodiment

Figure 3:
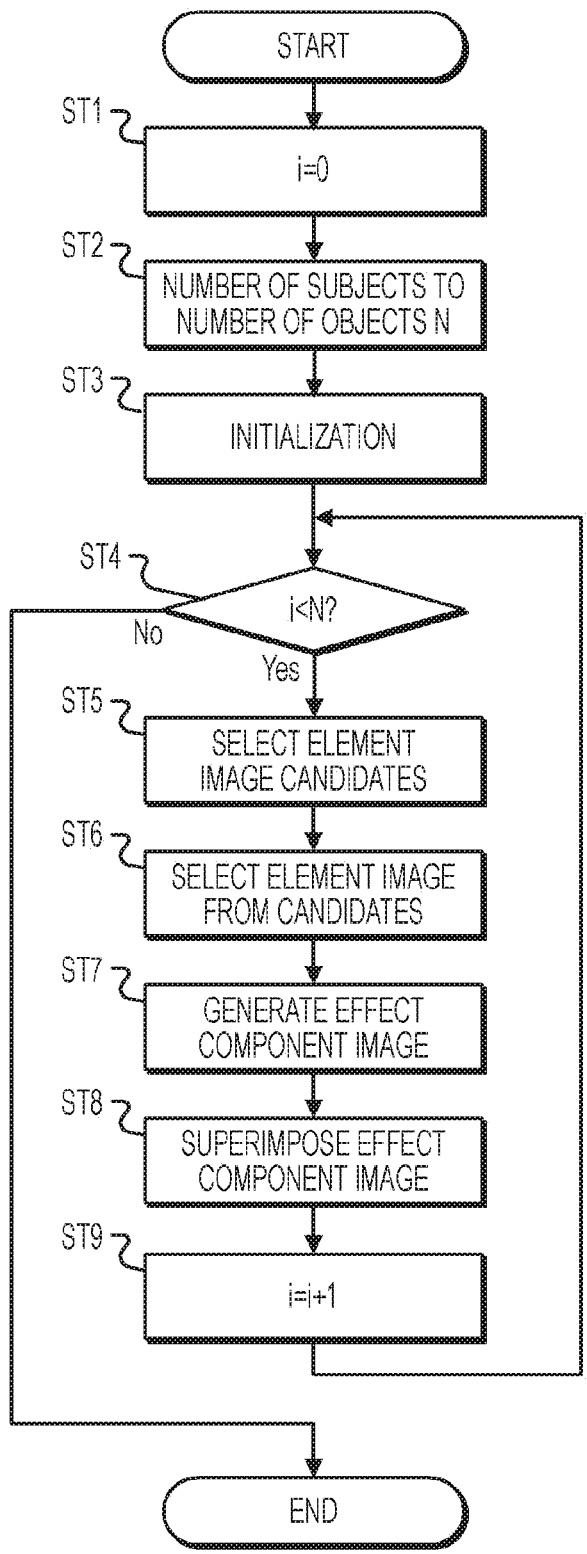
FIG. 3 is a flowchart illustrating the operation of the first embodiment.

FIG. 3 is a flowchart illustrating the operation of the first embodiment. In step ST1, the effect processing unit 22-1 initializes a parameter value i indicating the subject on which the effect process is to be performed and specifies the parameter value i as "0" to proceed to step ST2.

In step ST2, the effect processing unit 22-1 sets the number of subjects to the number of objects N. The effect processing unit 22-1 sets the number of subjects identified by performing the recognition process and the region segmentation process in the information acquisition unit 21-1 to the number of objects N and proceeds to step ST3.

In step ST3, the effect processing unit 22-1 initializes the effect component image to bring about a state in which an effect component image to be superimposed on the visible light image is not generated and proceeds to step ST4.

In step ST4, the effect processing unit 22-1 identifies whether the parameter value i is smaller than the number of objects N. In a case where the parameter value i is smaller than the number of objects N, the effect processing unit 22-1 proceeds to step ST5 and, in a case where the parameter value i is equal to or larger than the number of objects N, the effect processing unit 22-1 terminates the process.

In step ST5, the effect processing unit 22-1 selects element image candidates. The effect component image generation unit 221 of the effect processing unit 22-1 selects element image candidates corresponding to the type of an i-th subject and proceeds to step ST6.

In step ST6, the effect processing unit 22-1 selects an element image from the candidates. The effect component image generation unit 221 of the effect processing unit 22-1 selects an element image to be used for generating the effect component image from the element image candidates selected in step ST5 on the basis of the temperature information on the i-th subject and proceeds to step ST7.

In step ST7, the effect processing unit 22-1 generates the effect component image. The effect component image generation unit 221 of the effect processing unit 22-1 adjusts the image size and/or the number of the element images selected in step ST6 on the basis of the temperature information on the i-th subject. In addition, the effect component image generation unit 221 generates the effect component image to be superimposed onto the image of the i-th subject using the adjusted image size and number of the element images and proceeds to step ST8.

In step ST8, the effect processing unit 22-1 superimposes the effect component image. The effect component image superimposition unit 222 of the effect processing unit 22-1 superimposes the effect component image generated in step ST7 onto the image of the i-th subject on the visible light image and proceeds to step ST9.

In step ST9, the effect processing unit 22-1 updates the parameter value i to specify the parameter value i as "i=i+1" and returns to step ST4.

The effect processing unit 22-1 performs the process in the flowchart illustrated in FIG. 3 to perform the process of generating the effect component image and the process of superimposing the effect component image onto the visible light image for each subject identified by the information acquisition unit 21-1 and generates a visible light image with improved reality.

Figure 4C:
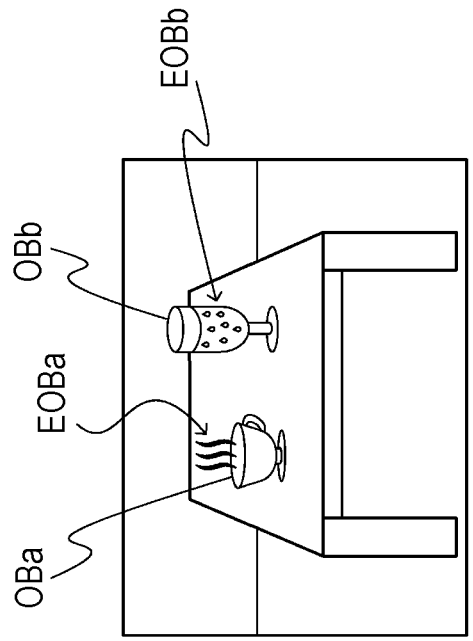
FIGS. 4A, 4B, and 4C are diagrams illustrating an operation example of the first embodiment.
Figure 4A:
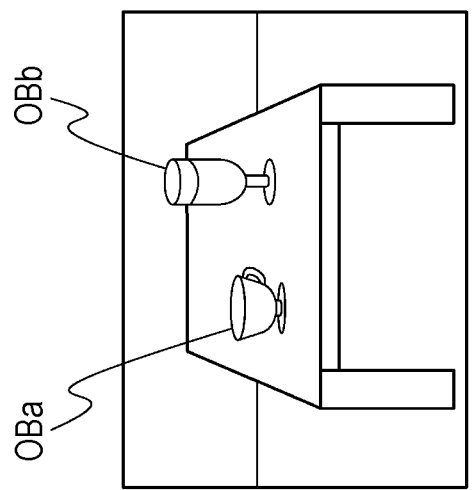
Figure 4B:
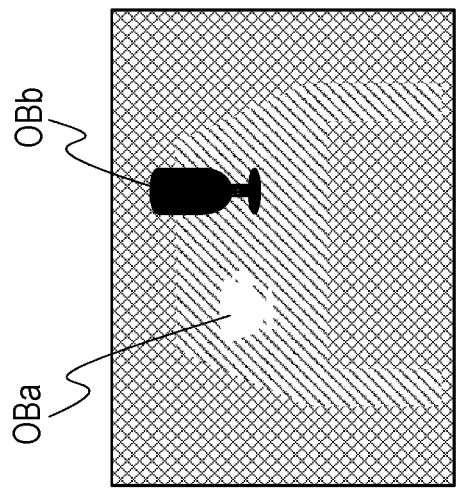

FIGS. 4A, 4B, and 4C illustrate an operation example of the first embodiment. In addition, FIGS. 5A, 5B, 5C, 5D, 5E, and, 5F are diagrams for explaining an operation of generating the effect component image.

In FIG. 4A, the visible light image based on the image data output from the visible light image generation unit 11 is exemplified and, in FIG. 4B, a temperature image based on the state information output from the state information generation unit 12 is exemplified. The temperature image indicates that the temperature rises as the luminance becomes higher and the temperature lowers as the luminance becomes lower. It is thus possible to identify the subjects on the visible light image from the temperature image in such a manner that, for example, a coffee cup OBa is at high temperature and a beer glass OBb is at low temperature.

In FIG. 5A, element images registered in advance are exemplified. The element image schematically represents a visually observable phenomenon that occurs in accordance with temperature and, for example, images schematically representing steam produced at high temperature, water droplets produced at low temperature, body tremor produced at low temperature, and the like are registered.

In FIG. 5B, element images selected as candidates are exemplified. In a case where the subject is a drink container such as a coffee cup or a beer glass, the effect component image generation unit 221 selects element images schematically representing steam and water droplets produced in the drink container as candidates.

In FIG. 5C, an element image selected from the candidates on the basis of the temperature information on the coffee cup is illustrated. As illustrated in FIG. 4B, the temperature information indicates that the coffee cup OBa is at high temperature. Accordingly, since the coffee cup OBa is at high temperature, the effect component image generation unit 221 selects an element image schematically representing steam. Furthermore, on the basis of the temperature information on the coffee cup OBa, for example, the effect component image generation unit 221 enlarges the size of the element image indicating steam and increases the number of the element images as the temperature of the coffee cup OBa rises and consequently, generates an effect component image EOBa illustrated in FIG. 5D.

In FIG. 5E, an element image selected from the candidates on the basis of the temperature information on the beer glass is illustrated. As illustrated in FIG. 4B, the temperature information indicates that the beer glass OBb is at low temperature. Accordingly, since the beer glass OBb is at low temperature, the effect component image generation unit 221 selects an element image schematically representing a water droplet. Furthermore, on the basis of the temperature information on the beer glass OBb, for example, the effect component image generation unit 221 increases the number of the element images indicating a water droplet as the temperature of the beer glass OBb lowers and consequently, generates an effect component image EOBb for the beer glass OBb illustrated in FIG. 5F.

The effect component image superimposition unit 222 superimposes the effect component image generated in accordance with the type information and the temperature information on the subject onto the corresponding subject image on the visible light image with a picture size corresponding to the region size of the subject. Accordingly, as illustrated in FIG. 4C, the effect component image EOBa indicating steam is superimposed onto the image of the coffee cup OBa at an appropriate position in an appropriate size. Meanwhile, the effect component image EOBb indicating water droplets is superimposed onto the image of the beer glass OBb at an appropriate position in an appropriate size. Therefore, it is possible to output a visible light image with improved reality from the image processing apparatus 20-1.

As described thus far, according to the first embodiment, the effect component image generated in accordance with the type and temperature of the subject is superimposed onto the image of the corresponding subject in regard to the images of the subjects on the visible light image. Accordingly, it is possible to generate a visible light image having the reality, in which the imaging object and the imaging situation are reflected. In addition, effects are added on the basis of the actual temperature information on the subject, such that it is possible to maintain a natural influence of the effects.

3. Second Embodiment

In a second embodiment, the state information is the temperature information and the image processing apparatus improves the reality of the visible light image by modifying the image of the subject on the visible light image in accordance with a change in a physical state of the subject.

3-1. Configuration of Second Embodiment

Figure 6:
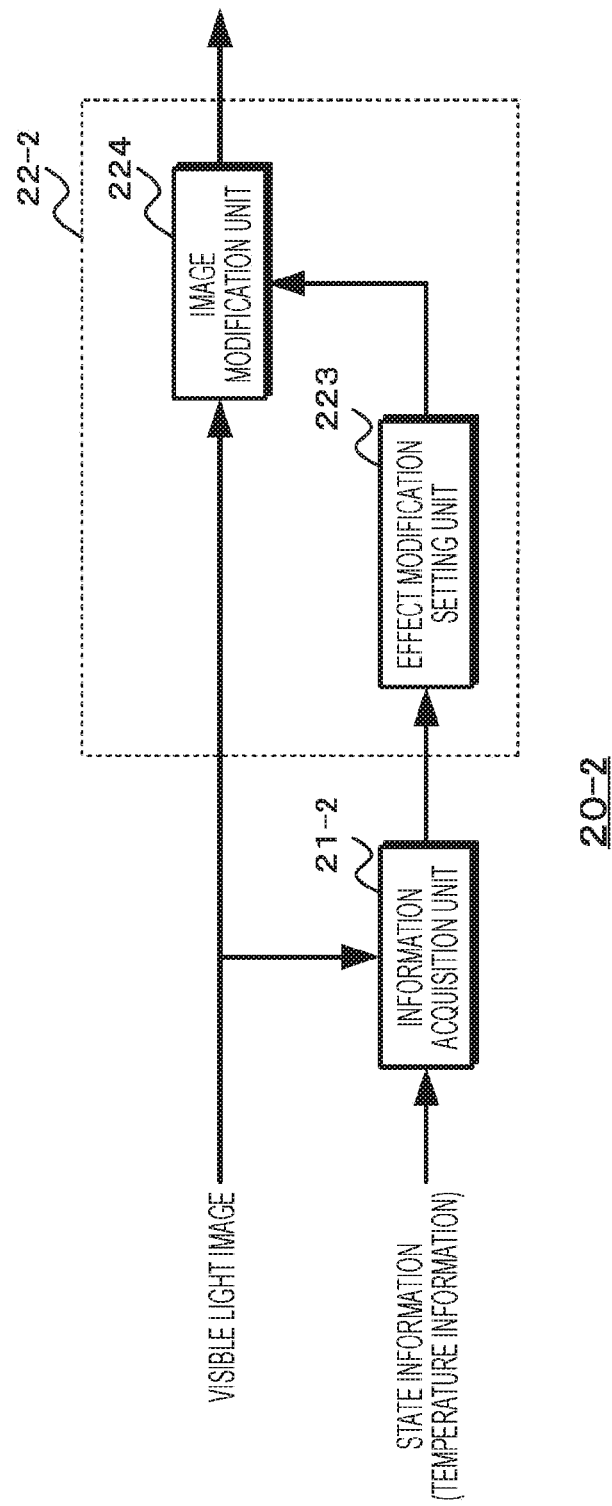
FIG. 6 is a diagram exemplifying the configuration of an image processing apparatus of a second embodiment.

FIG. 6 exemplifies the configuration of an image processing apparatus of a second embodiment. The image processing apparatus 20-2 has an information acquisition unit 21-2 and an effect processing unit 22-2. The effect processing unit 22-2 has an effect modification setting unit 223 and an image modification unit 224.

Similarly to the information acquisition unit 21-1, the information acquisition unit 21-2 performs the recognition process and the region segmentation process for the subject on the basis of the visible light image. The information acquisition unit 21-2 identifies what type of entity the subject is in the recognition process and generates the type information. The information acquisition unit 21-2 also identifies the image region of the subject in the region segmentation process. In addition, the information acquisition unit 21-2 acquires the temperature information on each subject from the temperature information, which is the state information generated by a state information generation unit 12, on the basis of a processing result of the region segmentation process. Furthermore, the information acquisition unit 21-2 may confirm the consistency between the temperature information and the type identification result to enhance the accuracy of the recognition process. The information acquisition unit 21-2 acquires the type information on the subject and its region and temperature information on the visible light image for each subject to output to the effect modification setting unit 223 of the effect processing unit 22-2.

The effect modification setting unit 223 sets effect modification that improves the reality, in accordance with the type and temperature of the subject on the basis of the type information and temperature information on the subject. The effect modification setting unit 223 stores the modification control information in advance for each effect modification that can be carried out. The modification control information is control information for modifying a subject image on the visible light image into an image in which a change in a physical state is produced in accordance with the temperature of an entity indicated by the type information. For example, control information to modify a subject image into an image depicting that atmospheric fluctuations are produced by heat, control information to modify a subject image into an image depicting that a change in a physical state between a solid phase and a liquid phase is produced and, for example, the water surface is frozen, and the like are stored as the modification control information. The effect modification setting unit 223 selects modification control information according to the type and temperature of the subject. Furthermore, the effect modification setting unit 223 may change a modification level by adjusting the modification control information in accordance with the temperature of the subject. For example, the modification level is changed such that the fluctuations grow as the temperature rises. In addition, the modification level is changed such that the sense of freezing becomes higher as the temperature lowers. The effect modification setting unit 223 outputs the set modification control information to the image modification unit 224.

The image modification unit 224 performs a modification process on the image region of the corresponding subject using the modification control information set by the effect modification setting unit 223, thereby improving the reality of the visible light image. The image region of the subject is identified by the above-described region segmentation process and the modification control information is set in accordance with the type and temperature of the subject whose image region has been identified. Accordingly, the image modification unit 224 can perform the modification process on the image of the corresponding subject using the modification control information. The image modification unit 224 generates the visible light image in which the image of the subject has been modified in accordance with the type and temperature of the subject to improve the reality, and records the generated visible light image to a recording medium or outputs the generated visible light image to external equipment such as a display apparatus or a recording apparatus.

3-2. Operation of Second Embodiment

Figure 7:
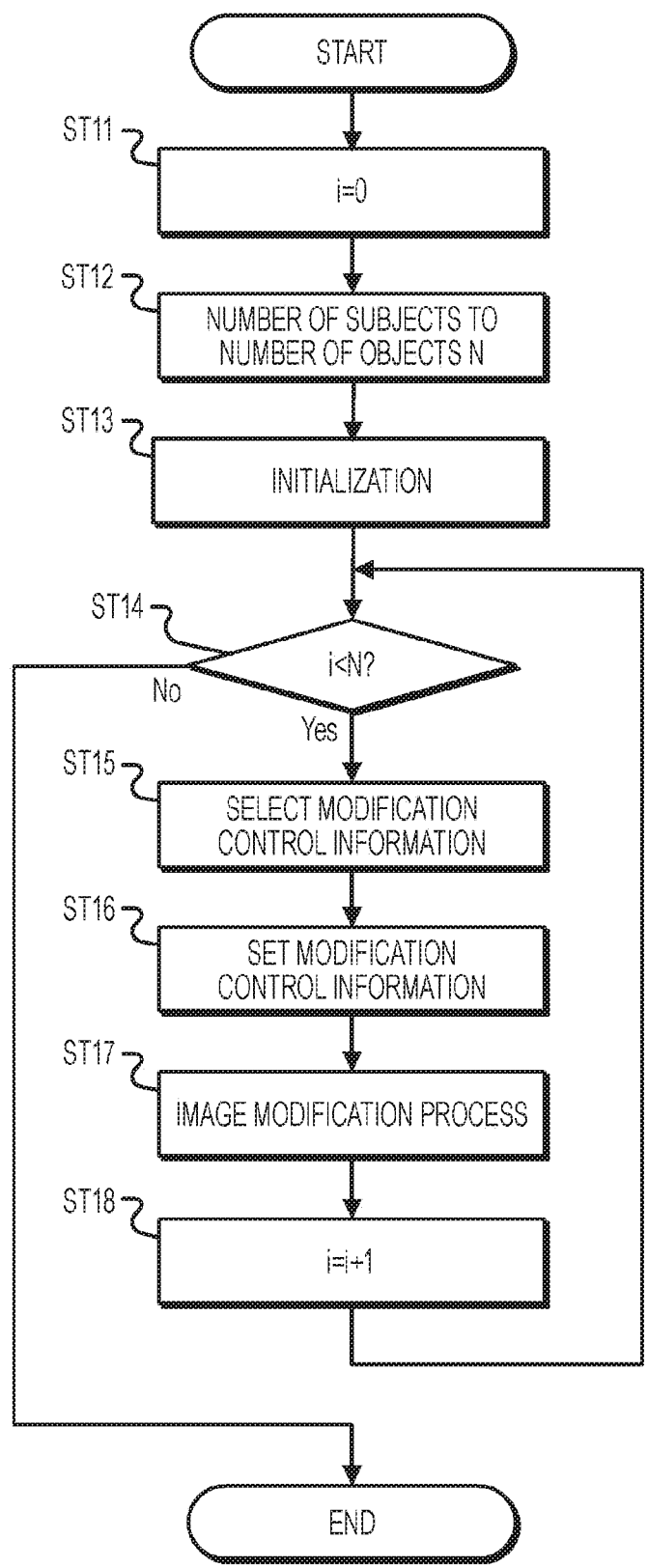
FIG. 7 is a flowchart illustrating the operation of the second embodiment.

FIG. 7 is a flowchart illustrating the operation of the second embodiment. In step ST11, the effect processing unit 22-2 initializes a parameter value i indicating the subject on which the effect process is to be performed and specifies the parameter value i as "0" to proceed to step ST12.

In step ST12, the effect processing unit 22-2 sets the number of subjects to the number of objects N. The effect processing unit 22-2 sets the number of subjects identified by performing the recognition process and the region segmentation process in the information acquisition unit 21-2 to the number of objects N and proceeds to step ST13.

In step ST13, the effect processing unit 22-2 initializes the modification control information to put the modification control information into a state in which the modification to the visible light image is not to be made and proceeds to step ST14.

In step ST14, the effect processing unit 22-2 identifies whether the parameter value i is smaller than the number of objects N. In a case where the parameter value i is smaller than the number of objects N, the effect processing unit 22-2 proceeds to step ST15 and, in a case where the parameter value i is equal to or larger than the number of objects N, the effect processing unit 22-2 terminates the process.

In step ST15, the effect processing unit 22-2 selects the modification control information. The effect modification setting unit 223 of the effect processing unit 22-2 selects the modification control information on the basis of the type of an i-th subject and the temperature information thereon and proceeds to step ST16.

In step ST16, the effect processing unit 22-2 sets the modification control information. The effect modification setting unit 223 of the effect processing unit 22-2 adjusts the modification control information set in step ST15 on the basis of the temperature information on the i-th subject such that the modification control information is set to a modification level according to the temperature and proceeds to step ST17.

In step ST17, the effect processing unit 22-2 performs an image modification process. The image modification unit 224 of the effect processing unit 22-2 performs the modification process on the image of the i-th subject on the visible light image using the modification control information set in step ST16 and proceeds to step ST18.

In step ST18, the effect processing unit 22-2 updates the parameter value i to specify the parameter value i as "i=i+1" and returns to step ST14.

The effect processing unit 22-2 performs the process in the flowchart illustrated in FIG. 7 to perform the modification process on each subject identified by the information acquisition unit 21-2 and generates a visible light image with improved reality.

Figure 8B:
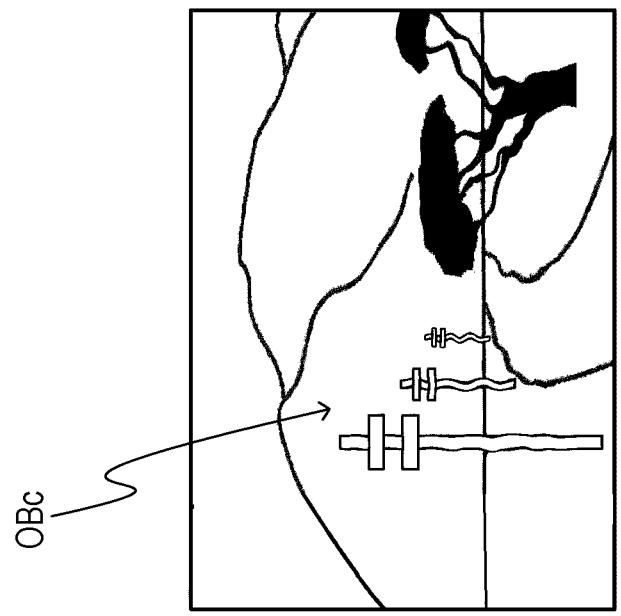
FIGS. 8A and 8B are diagrams illustrating a case where the temperature is high as an operation example of the second embodiment.
Figure 8A:
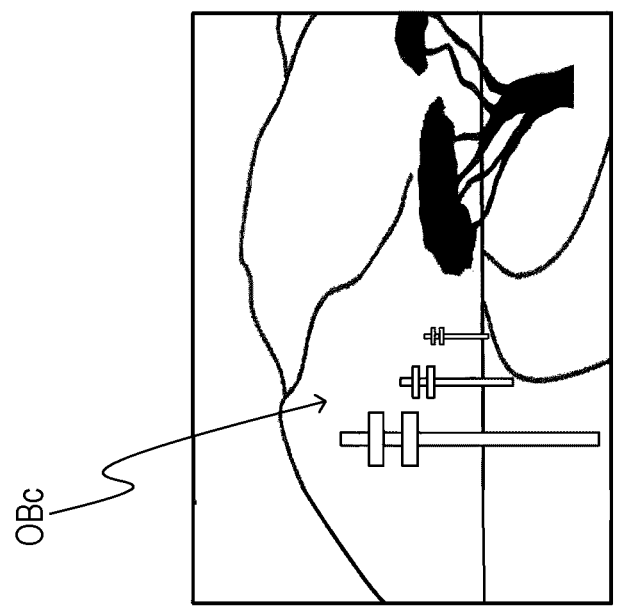

FIGS. 8A and 8B illustrate a case where the temperature is high as an operation example of the second embodiment. For example, FIG. 8A is an image in which an outdoor subject (for example, a utility pole) OBc appears. In a case where the temperature information indicates that the temperature of the subject OBc is high, the image modification unit 224 performs a modification process on the image of the subject OBc to depict that atmospheric fluctuations are produced, on the basis of the modification control information set on the basis of the temperature information and the like. Accordingly, as illustrated in FIG. 8B, the image processing apparatus 20-2 can generate a visible light image with improved reality by adding an effect expressing high temperature (for example, fluctuations) to the visible light image.

FIGS. 9A and 9B illustrate a case where the temperature is low as an operation example of the second embodiment. For example, FIG. 9A is an image obtained by imaging outdoors. In a case where the temperature information indicates that the temperature of an outdoor subject (for example, a lake surface) OBd is low, the image modification unit 224 performs a modification process on the image of the subject OBd to depict that freezing occurs, on the basis of the modification control information set on the basis of the temperature information and the like. Accordingly, as illustrated in FIG. 9B, the image processing apparatus 20-2 can generate a visible light image with improved reality by adding an effect expressing low temperature (for example, depiction of freezing) to the visible light image.

As described thus far, according to the second embodiment, modification is made on the image of the corresponding subject on the basis of the modification control information set in accordance with the type and temperature of the subject in regard to the images of the subjects on the visible light image. Accordingly, it is possible to generate a visible light image having the reality, in which the imaging object and the imaging situation are reflected. In addition, effects are added on the basis of the actual temperature information on the subject, such that it is possible to maintain a natural influence of the effects.

4. Third Embodiment

In a third embodiment, the state information is the temperature information and the image processing apparatus improves the reality of the visible light image by performing color adjustment.

4-1. Configuration of Third Embodiment

Figure 10:
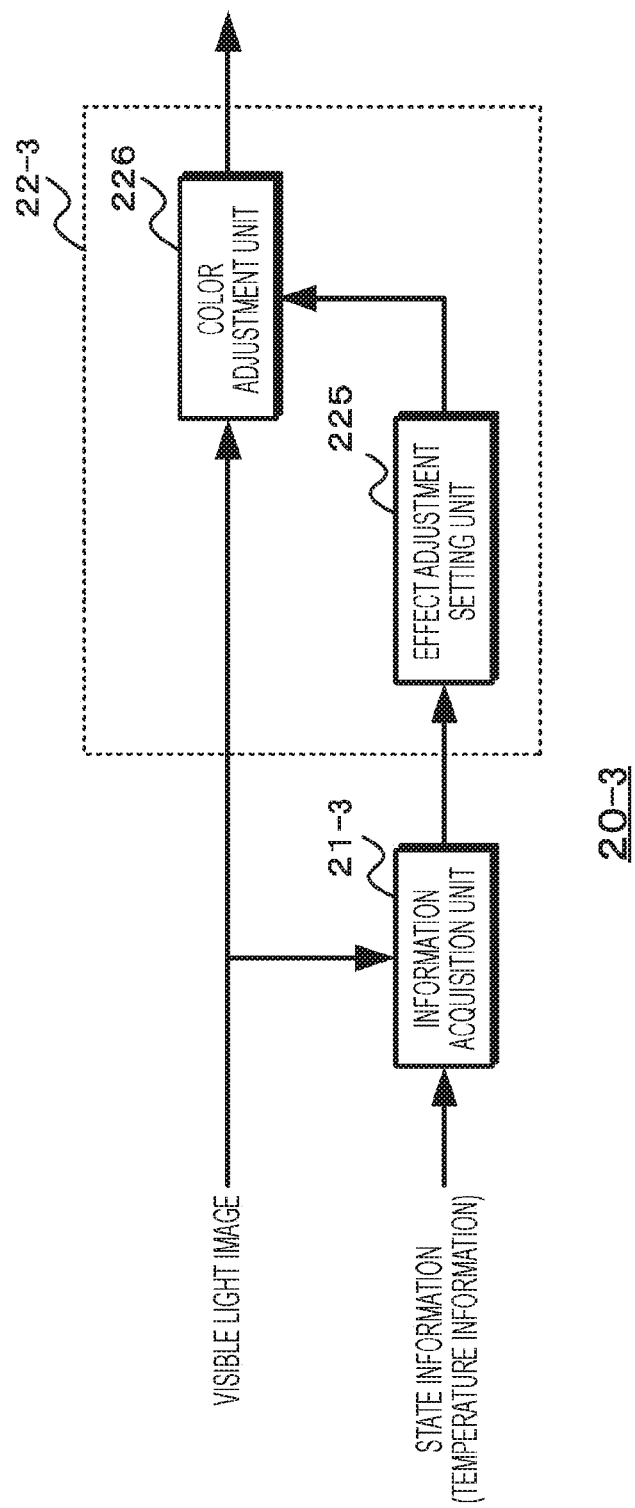
FIG. 10 is a diagram exemplifying the configuration of an image processing apparatus of a third embodiment.

FIG. 10 exemplifies the configuration of an image processing apparatus of the third embodiment. The image processing apparatus 20-3 has an information acquisition unit 21-3 and an effect processing unit 22-3. The effect processing unit 22-3 has an effect adjustment setting unit 225 and a color adjustment unit 226.

The information acquisition unit 21-3 performs a recognition process and a region segmentation process for the subject on the basis of the visible light image. The information acquisition unit 21-3 identifies a subject of interest in the recognition process. In addition, the information acquisition unit 21-3 acquires temperature information corresponding to the region of the subject of interest identified in the region segmentation process from the temperature information, which is the state information generated by a state information generation unit 12. Furthermore, the information acquisition unit 21-3 outputs the acquired temperature information on the subject of interest to the effect adjustment setting unit 225 of the effect processing unit 22-3. Note that the information acquisition unit 21-3 may output, to the effect adjustment setting unit 225, temperature information indicating the average temperature value of the temperature image, the average temperature of a central region, a temperature having the widest region of equal temperature, or the like.

The effect adjustment setting unit 225 sets the color adjustment (color temperature conversion) that improves the reality on the basis of the temperature information, which is the state information output from the state information generation unit 12. The effect adjustment setting unit 225 sets adjustment control information in accordance with the temperature indicated by the temperature information. The adjustment control information is control information that adjusts the visible light image to a warm color system or a cool color system. The effect adjustment setting unit 225 outputs the set adjustment control information to the color adjustment unit 226.

Using the adjustment control information set by the effect adjustment setting unit 225, the color adjustment unit 226 performs color adjustment (color temperature conversion) on the visible light image in which white balance has been adjusted, thereby improving the reality of the visible light image. The color adjustment unit 226 generates the visible light image on which color adjustment has been performed in accordance with temperature to improve the reality, and records the generated visible light image to a recording medium or outputs the generated visible light image to external equipment such as a display apparatus or a recording apparatus.

Note that the image processing apparatus 20-3 may extract the temperature information for each subject as in the second embodiment and perform color adjustment for each subject on the basis of the extracted temperature information to generate the visible light image with improved reality.

4-2. Operation of Third Embodiment

FIGS. 11A and 11B illustrate a case where the temperature is low as an operation example of the third embodiment. For example, FIG. 11A is an image obtained by imaging outdoors. In a case where the temperature information indicates that the outdoor temperature is low, the color adjustment unit 226 performs color adjustment on the visible light image to apply a color of the cool color system thereto (color temperature conversion to raise the color temperature) on the basis of the adjustment control information set on the basis of the temperature information and the like. Accordingly, as illustrated in FIG. 11B, the image processing apparatus 20-3 can generate a visible light image with improved reality by adding an effect expressing low temperature to the visible light image.

Figure 12B:
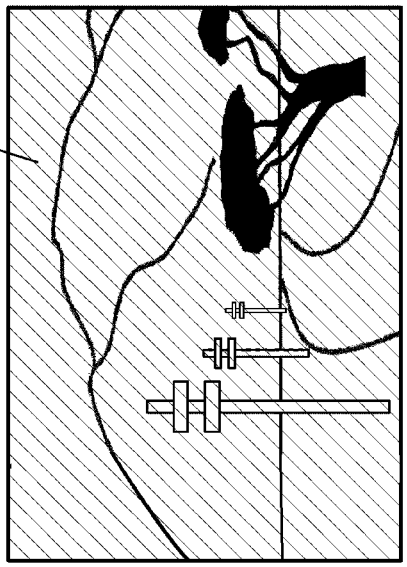
FIGS. 12A and 12B are diagrams illustrating a case where the temperature is high as an operation example of the third embodiment.
Figure 12A:
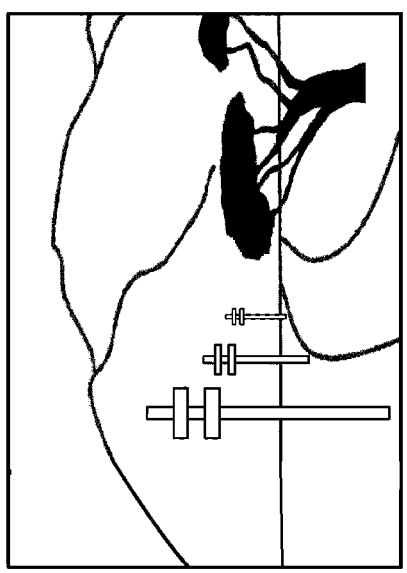

FIGS. 12A and 12B illustrate a case where the temperature is high as an operation example of the third embodiment. For example, FIG. 12A is an image obtained by imaging outdoors. In a case where the temperature information indicates that the outdoor temperature is high, the color adjustment unit 226 performs color adjustment on the visible light image to apply a color of the warm color system thereto (color temperature conversion to lower the color temperature) on the basis of the adjustment control information set on the basis of the temperature information and the like. Accordingly, as illustrated in FIG. 12B, the image processing apparatus 20-3 can generate a visible light image with improved reality by adding an effect expressing high temperature to the visible light image.

As described thus far, according to the third embodiment, color adjustment (color temperature adjustment) is performed on the visible light image in which white balance has been adjusted, on the basis of the adjustment control information set in accordance with temperature. Accordingly, it is possible to generate a visible light image having the reality, in which the imaging situation is reflected and the sense of temperature is emphasized. In addition, effects are added on the basis of the actual temperature information, such that it is possible to maintain a natural influence of the effects.

5. Fourth Embodiment

In a fourth embodiment, the state information is the sound field information and, the image processing apparatus improves the reality of the visible light image by superimposing an effect component image according to the sound field information onto the visible light image. The image processing apparatus also modifies the subject image on the visible light image in accordance with the sound field information to improve the reality of the visible light image.

5-1. Configuration of Fourth Embodiment

FIG. 13 exemplifies the configuration of the fourth embodiment. An image processing apparatus 20-4 has an information acquisition unit 21-4 and an effect processing unit 22-4. The effect processing unit 22-4 has an image generation/modification setting unit 227 and a superimposition/modification unit 228.

The information acquisition unit 21-4 identifies the direction of the sound source and the type of the sound source from the sound field information generated by a state information generation unit 12. The direction of the sound source can be identified using, for example, the technology disclosed in the document "Shoji Makino, et al., "Blind Source Separation based on Independent Component Analysis", the Institute of Electronics, Information and Communication Engineers Technical Report, EA2003-45, vol. 103, No. 129 (2003), pp. 17-24". In addition, as for the type of the sound source, for example, the technology disclosed in the document "Katsutoshi Itoyama, Hiroshi Okuno, "Parameter Estimation of Virtual Sound Source for Musical Instrument Sound", Research Report on Information Processing Society of Japan, 2013 (2013)" is used. According to this technology, in regard to a musical instrument sound having noise and distortion when sound source separation is performed, it is possible to estimate a parameter of a virtual musical instrument sound source for obtaining a clean musical instrument sound that does not include such noise and distortion, such that the type of the object can be estimated utilizing this parameter. The information acquisition unit 21-4 acquires the direction of the sound source and the type of the sound source to output to the image generation/modification setting unit 227 of the effect processing unit 22-4.

The image generation/modification setting unit 227 generates an effect component image that improves the reality on the basis of the type of the sound source. The image generation/modification setting unit 227 generates the effect component image using, for example, an element image according to the type of the sound source. As the element images, for example, element images indicating vibrations or the like are prepared for percussion instruments such that effects for clear and crisp sound can be added. Element images indicating musical notes or the like are prepared for wind instruments such that effects as if sounds come from the tube can be added. Element images indicating musical scores or the like are prepared for stringed instruments such that effects as if playing melodies can be added. In addition, the element image is not limited to musical instruments, but element images according to sounds output from vehicles, or the like may be prepared. For example, element images and the like indicating warning whistle marks or the like may be prepared for a horn sound of a car.

Furthermore, the image generation/modification setting unit 227 may control attributes of the effect component image, for example, the dimension and the number of element images, on the basis of the sound field information. For example, as the sound has more intensity, the effect component image generation unit 221 enlarges the size of element image or increases the number of element images. The image generation/modification setting unit 227 outputs the generated effect component image to the superimposition/modification unit 228.

In addition, the image generation/modification setting unit 227 may set the effect modification to improve the reality in accordance with the intensity of the sound indicated by the sound field information. The image generation/modification setting unit 227 stores in advance the modification control information relating to a plurality of effect modifications for the sound field information. The modification control information is control information that modifies the subject image on the visible light image on the basis of the type of the sound source, the intensity of the sound, and the like. For example, modification control information to modify a subject image into an image depicting that a blurring effect is produced by sound, modification control information to modify a subject image into an image depicting that fluctuations are produced in a subject by sound, and the like are stored as the modification control information. The image generation/modification setting unit 227 selects the modification control information according to the type of the sound source and the like. Furthermore, the image generation/modification setting unit 227 may change a modification level by adjusting the modification control information in accordance with the intensity of the sound. The image generation/modification setting unit 227 outputs the set modification control information to the superimposition/modification unit 228.

The superimposition/modification unit 228 performs a process on the image region of the corresponding subject using the effect component image generated by the image generation/modification setting unit 227 and the modification control information set by the image generation/modification setting unit 227, thereby improving the reality of the visible light image. The superimposition/modification unit 228 superimposes the effect component image generated by the image generation/modification setting unit 227 onto the subject image of the sound source. In addition, the superimposition/modification unit 228 performs modification processes according to the modification control information on the subject image of the sound source and other subject images. The superimposition/modification unit 228 superimposes the effect component image at the position of the sound source and performs image modification, for example, on a subject image different from that of the sound source, thereby generating a visible light image with improved reality. In addition, the superimposition/modification unit 228 records the generated visible light image to a recording medium or outputs the generated visible light image to external equipment such as a display apparatus or a recording apparatus.

Note that the image generation/modification setting unit 227 may perform only one of the generation of the effect component image and the setting of the modification control information such that the superimposition/modification unit 228 either superimposes the effect component image or modifies the visible light image, on the basis of the output from the image generation/modification setting unit 227.

5-2. Operation of Fourth Embodiment

Figures 14A, 14B:
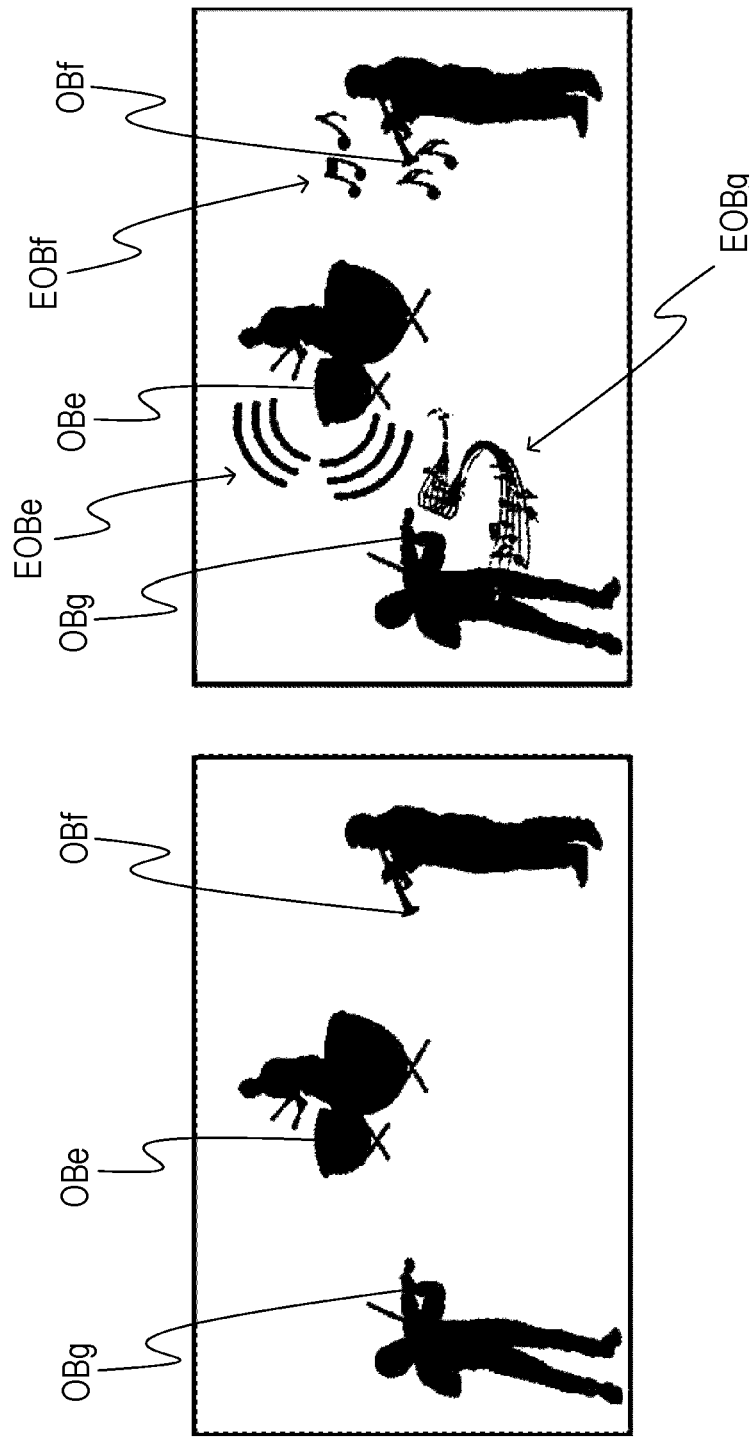
FIGS. 14A and 14B are diagrams exemplifying a visible light image in which the reality is improved using the effect component image.

FIGS. 14A and 14B exemplifies a visible light image in which the reality is improved using the effect component image. In FIG. 14A, a visible light image obtained by imaging players of a percussion instrument OBe, a wind instrument OBf, and a stringed instrument OBg is illustrated. The superimposition/modification unit 228 superimposes an effect component image generated in accordance with the type of the sound source by the image generation/modification setting unit 227, for example, at the position of an image indicating the percussion instrument OBe. In addition, the superimposition/modification unit 228 superimposes an effect component image generated in accordance with the type of the sound source by the image generation/modification setting unit 227 at the position of an image indicating the wind instrument OBf. Furthermore, the superimposition/modification unit 228 superimposes an effect component image generated in accordance with the type of the sound source by the image generation/modification setting unit 227 at the position of an image indicating the stringed instrument OBg. Accordingly, as illustrated in FIG. 14B, the image processing apparatus 20-4 can generate a visible light image with improved reality by adding an effect according to the type of the sound source to the visible light image. Note that, in the visible light image illustrated in FIG. 14B, an effect component image EOBe indicating vibrations is superimposed at the position of an image indicating the percussion instrument OBe, an effect component image EOBf indicating musical notes is superimposed at the position of an image indicating the wind instrument OBf, and an effect component image EOBg indicating musical scores is superimposed at the position of an image indicating the stringed instrument OBg.

Figure 15B:
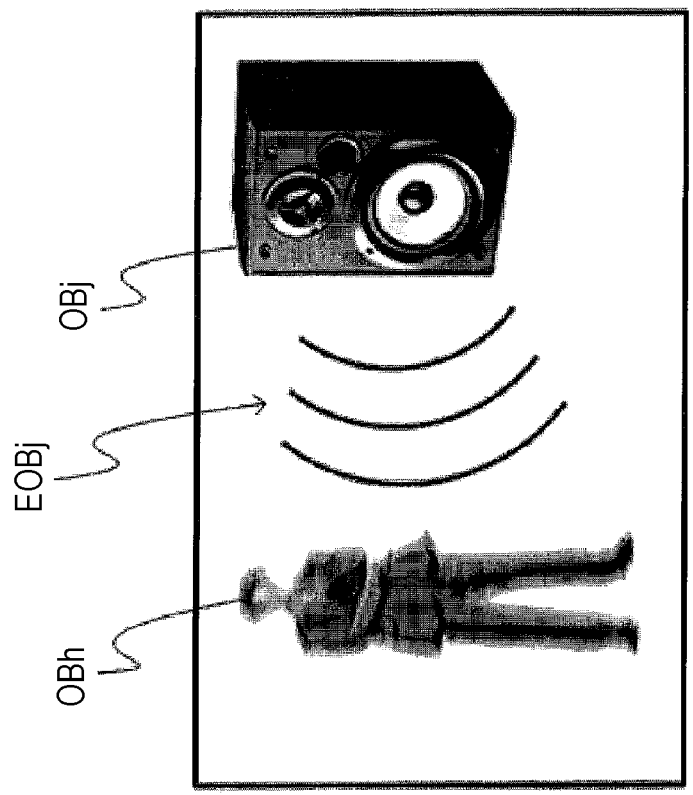
FIGS. 15A and 15B are diagrams exemplifying a visible light image in which the reality is improved using the effect component image and modification control information.
Figure 15A:
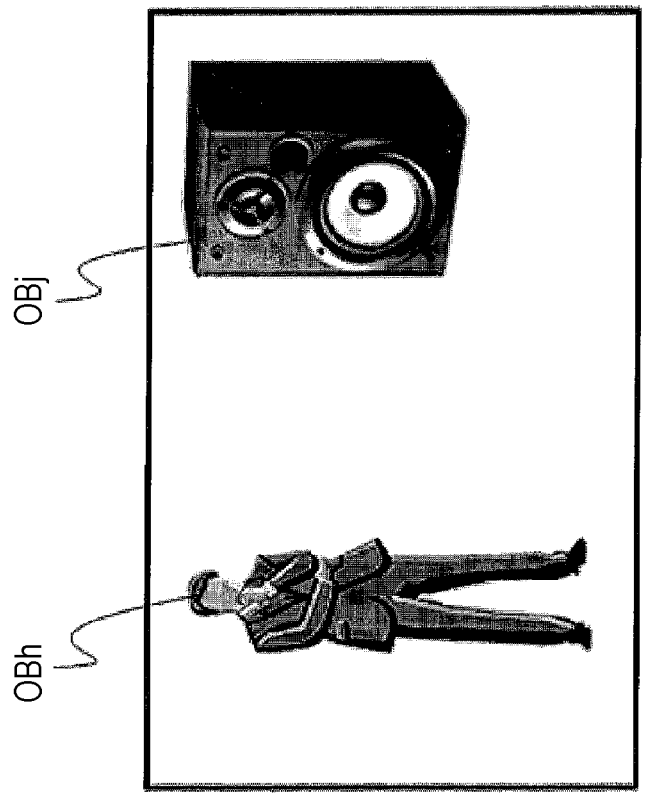

FIGS. 15A and 15B exemplifies a visible light image in which the reality is improved using the effect component image and the modification control information. In FIG. 15A, a visible light image obtained by imaging a speaker and a listener together is illustrated. Using the modification control information set in accordance with the type of the sound source and the intensity of the sound by the image generation/modification setting unit 227, the superimposition/modification unit 228 modifies the image of the listener OBh, for example, into an image in which a blurring effect standing for vibrations is produced. In addition, the superimposition/modification unit 228 superimposes an effect component image generated in accordance with the type of the sound source by the image generation/modification setting unit 227 onto an image indicating the speaker (sound source) OBj. Accordingly, as illustrated in FIG. 15B, the image processing apparatus 20-4 can generate a visible light image with improved reality by adding an effect according to the intensity of the sound to the visible light image. Note that, in the visible light image illustrated in FIG. 15B, the image of the listener OBh is altered to an image in which a blurring effect is produced and the effect component image EOBj indicating vibrations is superimposed at the position of an image indicating the speaker OBj.

As described thus far, according to the fourth embodiment, the effect component image generated in accordance with the type of the sound source and the intensity of the sound is superimposed onto the image of the sound source in regard to the images of the subjects on the visible light image. Furthermore, modification is made on the image of a subject located around the sound source on the basis of the modification control information set in accordance with the intensity of the sound. Accordingly, it is possible to generate a visible light image having the reality, in which the imaging object and the imaging situation are reflected. In addition, effects are added on the basis of the actual sound field state, such that it is possible to maintain a natural influence of the effects.

6. Other Embodiments

The first to third embodiments may be performed individually or in combination. For example, the first and second embodiments may be combined such that the effect component image is superimposed and an image is modified based on the modification control information as in the fourth embodiment to generate a visible light image with improved reality. In addition, in the fourth embodiment, the effect component image is superimposed and an image is modified based on of the modification control information, but only one of these operations may be performed to generate a visible light image with improved reality. Furthermore, the first to fourth embodiments may be carried out in combination using the temperature information and the sound field information as the state information.

The series of processes described in the description can be executed by hardware, software, or a complex configuration of both. In the case of executing the processes by software, a program recording a processing sequence is installed on a memory within a computer incorporated in dedicated hardware and executed. Alternatively, it is possible to install and execute the program on a general-purpose computer capable of executing various processes.

For example, the program can be recorded in advance on a hard disk, a solid state drive (SSD), or a read only memory (ROM) as a recording medium. Alternatively, the program can be temporarily or permanently saved and kept (recorded) on a removable recording medium such as a flexible disk, a compact disc read only memory (CD-ROM), a magneto optical (MO) disk, a digital versatile disc (DVD), a Blu-Ray Disc (BD) (registered trademark), a magnetic disk, or a semiconductor memory card. Such a removable recording medium can be provided as so-called package software.

Furthermore, in addition to installing the program from a removable recording medium on a computer, the program may be wirelessly or wiredly transferred from a download site to a computer via a network such as a local area network (LAN) or the Internet. In the computer, it is possible to receive the program transferred in such a manner and to install the program on a recording medium such as a built-in hard disk.

Note that the effects described in the present description merely serve as examples and not construed to be limited. There may be an additional effect not described herein as well. Furthermore, the present technology should not be interpreted as being limited to the embodiments of the above-described technology. The embodiments of this technology disclose the present technology in the form of exemplification and it is self-evident that those skilled in the art can make modifications and substitutions of the embodiments without departing from the gist of the present technology. That is, in order to judge the gist of the present technology, claims should be considered.

Furthermore, the image processing apparatus of the present technology can have the following configuration.

(1) An image processing apparatus including:
an information acquisition unit that acquires state information corresponding to a subject on a visible light image from state information indicating a subject state not indicated on the visible light image; and
an effect processing unit that performs an effect process on the visible light image on the basis of the state information acquired by the information acquisition unit.

(2) The image processing apparatus according to (1), in which
the state information is temperature information, and
the effect processing unit performs an effect process according to temperature.

(3) The image processing apparatus according to (2), in which
the information acquisition unit acquires type information on the subject by performing a recognition process for the subject, and
the effect processing unit superimposes an effect component image according to a temperature and a type of the subject onto an image of the subject on the basis of the state information and the type information.

(4) The image processing apparatus according to (3), in which the effect processing unit uses, as the effect component image, an image schematically representing a visually observable phenomenon that occurs in accordance with temperature.

(5) The image processing apparatus according to (3) or (4), in which the effect processing unit controls an attribute of the effect component image in accordance with a difference in temperature of the subject.

(6) The image processing apparatus according to any one of (2) to (5), in which the effect processing unit modifies a subject image on the visible light image into an image in which a physical state of the subject is changed in accordance with a temperature of the subject.

(7) The image processing apparatus according to (6), in which the effect processing unit regards a change between a solid phase and a liquid phase as the change in the physical state.

(8) The image processing apparatus according to (6) or (7), in which the effect processing unit controls a modification level in accordance with a difference in the temperature.

(9) The image processing apparatus according to any one of (2) to (8), in which the effect processing unit performs color adjustment on the visible light image in accordance with a temperature of the subject.

(10) The image processing apparatus according to (9), in which the effect processing unit performs color adjustment to a warm color system when a temperature of the subject is high and performs color adjustment to a cool color system in a case where a temperature of the subject is low.

(11) The image processing apparatus according to any one of (1) to (10), in which
the state information is sound field information, and
the effect processing unit performs an effect process according to the sound field information.

(12) The image processing apparatus according to (11), in which the effect processing unit superimposes an effect component image onto a subject on the visible light image corresponding to a position of a sound source based on the sound field information.

(13) The image processing apparatus according to (12), in which the effect processing unit superimposes an effect component image associated with a sound output from the sound source onto a region of the visible light image.

(14) The image processing apparatus according to any one of (11) to (13), in which the effect processing unit adjusts an effect amount for the visible light image in accordance with intensity of a sound output from a sound source based on the sound field information.

INDUSTRIAL APPLICABILITY

In the image processing apparatus, the image processing method, and the program according to this technology, state information corresponding to a subject on a visible light image is acquired from state information indicating a subject state not indicated on the visible light image and an effect process is performed on the visible light image on the basis of the acquired state information. Therefore, the improvement of the reality can be achieved in the visible light image. Accordingly, it is suitable for an imaging apparatus, an editing apparatus, and the like.

REFERENCE SIGNS LIST

10 System
11 Visible light image generation unit
12 State information generation unit
20, 20-1, 20-2, 20-3, 20-4 Image processing apparatus
21, 21-1, 21-2, 21-3, 21-4 Information acquisition unit
22, 22-1, 22-2, 22-3, 22-4 Effect processing unit
221 Effect component image generation unit
222 Effect component image superimposition unit
223 Effect modification setting unit
224 Image modification unit
225 Effect adjustment setting unit
226 Color adjustment unit
227 Image generation/modification setting unit
228 Superimposition/modification unit

The invention claimed is:
1. An image processing apparatus, comprising:
circuitry configured to:
acquire state information corresponding to a subject on a visible light image, wherein
the state information corresponds to temperature information indicating a temperature of the subject, and
an indication of the temperature of the subject is absent in the visible light image;
execute a recognition process for the subject;

acquire type information of the subject based on the execution of the recognition process, wherein the type information indicates a type of the subject; and superimpose an effect component image on the subject in the visible light image based on
- the temperature information indicating the temperature of the subject, and
- the type information indicating the type of the subject.

2. The image processing apparatus according to claim 1, wherein the effect component image represents a visually observable phenomenon based on the temperature information.

3. The image processing apparatus according to claim 1, wherein the circuitry is further configured to control an attribute of the effect component image based on change in the temperature of the subject.

4. The image processing apparatus according to claim 1, wherein the circuitry is further configured to:
- modify a subject image of the subject on the visible light image into a specific image; and
- change a physical state of the subject in the specific image based on the temperature of the subject.

5. The image processing apparatus according to claim 4, wherein the change in the physical state corresponds to a change between a solid phase of the subject and a liquid phase of the subject.

6. An image processing method, comprising:

acquiring, by circuitry, state information corresponding to a subject on a visible light image, wherein
- the state information corresponds to temperature information indicating a temperature of the subject, and
- an indication of the temperature of the subject is absent in the visible light image;

executing, by the circuitry, a recognition process for the subject;

acquiring, by the circuitry, type information of the subject based on the execution of the recognition process, wherein the type information indicates a type of the subject; and superimposing, by the circuitry, an effect component image on the subject in the visible light image based on
- the temperature information indicating the temperature of the subject, and
- the type information indicating the type of the subject.

7. A non-transitory computer-readable medium having stored thereon, computer-executable instructions which when executed by a computer, cause the computer to execute operations, the operations comprising:

acquiring state information corresponding to a subject on a visible light image, wherein
- the state information corresponds to temperature information indicating a temperature of the subject, and
- an indication of the temperature of the subject is absent in the visible light image;

executing a recognition process for the subject;

acquiring type information of the subject based on the execution of the recognition process, wherein the type information indicates a type of the subject; and superimposing an effect component image on the subject in the visible light image based on
- the temperature information indicating the temperature of the subject, and
- the type information indicating the type of the subject.

8. An image processing apparatus, comprising:

circuitry configured to:
- acquire state information corresponding to a subject on a visible light image, wherein
  - the state information corresponds to temperature information indicating a temperature of the subject, and
  - an indication of the temperature of the subject is absent in the visible light image;
- modify a subject image of the subject on the visible light image into a specific image; and
- change a physical state of the subject in the specific image based on the temperature of the subject, wherein the change in the physical state corresponds to a change between a solid phase of the subject and a liquid phase of the subject.

9. An image processing method, comprising:

acquiring, by circuitry, state information corresponding to a subject on a visible light image, wherein
- the state information corresponds to temperature information indicating a temperature of the subject, and
- an indication of the temperature of the subject is absent in the visible light image;

modify a subject image of the subject on the visible light image into a specific image; and change a physical state of the subject in the specific image based on the temperature of the subject, wherein the change in the physical state corresponds to a change between a solid phase of the subject and a liquid phase of the subject.

* * * * *